(12) United States Patent
Giles

(10) Patent No.: US 6,857,084 B1
(45) Date of Patent: Feb. 15, 2005

(54) MULTIPROCESSOR SYSTEM AND METHOD FOR SIMULTANEOUSLY PLACING ALL PROCESSORS INTO DEBUG MODE

(75) Inventor: Christopher M. Giles, Lafayette, CO (US)

(73) Assignee: LSI Logic Corporation, Milpitas, CA (US)

( * ) Notice: Subject to any disclaimer, the term of this patent is extended or adjusted under 35 U.S.C. 154(b) by 577 days.

(21) Appl. No.: 09/922,755

(22) Filed: Aug. 6, 2001

(51) Int. Cl.[7] .............................................. G06F 11/30
(52) U.S. Cl. ......................................................... 714/35
(58) Field of Search ........................... 714/30, 34, 35; 709/227, 229

(56) References Cited

U.S. PATENT DOCUMENTS 6,031,991 A  *  2/2000  Hirayama ................... 717/127
6,718,294 B1 *  4/2004  Bortfeld ...................... 703/20

OTHER PUBLICATIONS

MIPS Technologies MIPS32 4K tm Processor Core Family Integrator's Manual. Doc. No. MD00036 Rev. 1.08 26–2001—Author(s)—MIPS Tech. Inc.
"MIPS32 4KEc tm Processor Core Datasheet"—Author(s)—MIPS Tech. Inc.

* cited by examiner

*Primary Examiner*—Scott Baderman
(74) *Attorney, Agent, or Firm*—L. Jon Lindsay

(57) ABSTRACT

Multiple processors of a multiprocessor system are placed into a debug mode of operation approximately simultaneously when one processor initially enters the debug mode as a result of incurring a debug event. The other processors enter the debug mode as a result of the one processor asserting a debug event signal upon initially entering the debug mode. A logic circuit associated with each processor responds to any debug event signal asserted by another processor and the failure of its associated processor to assert a debug event signal, to assert an external debug break signal to the associated processor and place the associated processor into the debug mode.

25 Claims, 2 Drawing Sheets

MULTIPROCESSOR SYSTEM AND METHOD FOR SIMULTANEOUSLY PLACING ALL PROCESSORS INTO DEBUG MODE

This invention relates to debugging multiprocessor systems, such as those which may be used in a computer system or in a specific device having dedicated functionality, such as a communications interface. More particularly, the present invention relates to a new and improved circuit and method of placing all processors of a multiprocessor system into a debug mode of operation approximately simultaneously when any one of the processors enters the debug mode.

BACKGROUND OF THE INVENTION

In a multiprocessor computer system, a processor is placed into the debug mode of operation by halting its execution of programmed instructions. The processor then resolves internal conflicts, enters a steady state, and goes into the debug mode. A debug monitor program executes on the processor while the processor is in the debug mode to provide access to the internal resources of the processor. The internal resources of the processor may then be examined to debug the program or the processor hardware. Typically, contents of internal registers and memory locations of the processor are examined and possibly altered using the debug monitor. After the debug monitor completes execution, the processor is taken out of the debug mode and the processor resumes execution of program instructions, usually at the point where the execution of program instructions stopped as a result of the processor entering the debug mode.

The processor may enter the debug mode upon the occurrence of a debug event exception. There are many types of debug events which may occur during normal processing. Sometimes the normal programmed instructions include a debug breakpoint program instruction which causes the processor to enter the debug mode simply as a result of executing that debug breakpoint program instruction in the normal flow of executing the programmed instructions. Specific addresses and/or data values may be used as events which cause the processor to enter the debug mode when those addresses are accessed or the data is fetched. There are many other recognized ways to cause the processor to enter the debug mode.

When one of the processors in a multiprocessor computer system enters the debug mode, the other processors continue to execute program instructions unless they also encounter a debug event and enter the debug mode. However, most debug events incurred by the different processors of a multiprocessor system are generally unsynchronized and independent of each other. By the time that all processors have been stopped, the state of the processors will have advanced to the point that the use of the state extracted from these processors in the determination of the cause of the unexpected debug event is no longer valid. Consequently, it is extremely difficult or impossible to probe the state of the processors in order to evaluate the cause and effect of the debug event. All of the processors of a multiprocessor system should be placed into the debug mode at approximately the same time to perform accurate and meaningful evaluation of the debug event in which the internal resources of more than one processor are examined. Placing all of the processors into the debug mode at approximately the same time preserves the states of the processors at approximately the time when one of the processors enters the debug mode, and limits or prevents the other processors from continuing to execute normal program instructions.

The typical technique of placing the other processors of a multiprocessor system into the debug mode when one of the processors of the system encounters a debug event is to assert hardware interrupts under control of the debug monitor program of the processor which incurred the debug event. However, halting the other processors under control of the debug monitor program when one processor enters the debug mode may result in an excessive time delay before the other processors of the multiprocessor system can halt execution of their program instructions. During this time delay, the continued execution of the program instructions by the other processors does not adequately preserve, for debugging purposes, the state of the other processors at the time of the debug event. Because of the interrelationship in functionality and program execution of the processors of a multiprocessor system, it may be critical to preserve the state of each of the processors in order to determine the cause of a debug event which affected only one processor. The inability to preserve the state of all of the processors may inhibit, prevent or delay the determination of those conditions which caused the debug event to occur. Such impediments may greatly complicate the task of debugging a multiprocessor system.

It is with respect to these and other considerations that have given rise to the present invention.

SUMMARY OF THE INVENTION

One aspect of the present invention relates to placing multiple processors of a multiprocessor system into a debug mode of operation approximately simultaneously when one of the processors enters the debug mode as the result of incurring a debug event. The processors are placed into the debug mode without an excessive time delay to preserve the states of the processors for multiprocessor debug by halting all of the processors at approximately the same time. The processors enter the debug mode in an approximately synchronous manner without human or complex intervention and by using circuitry and responses that are localized to each processor.

In accordance with these and other aspects, a multiprocessor system includes a logic circuit for each processor that generates an external debug break signal for that processor when any other processor of the system enters the debug mode as a result of incurring a debug event. The processor which enters the debug mode generates a debug event signal which is applied to the logic circuits associated with the other processors. The debug event signal is used by the logic circuits to generate one of several external debug break signals for the other associated processors. Other aspects of the present invention include placing the processors into the debug mode in an approximately synchronous manner and placing each processor into the debug mode when any other processor of the system asserts the debug event signal. In accordance with certain aspects of the present invention, an external logic circuit of each processor includes an OR gate which receives the debug event signal from another processor of the system and generates a debug trigger signal in response to the debug event signal. The external logic circuit also includes an AND gate which receives the debug trigger signal and an inverted copy of the debug event signal and generates a logical AND of these signals to create the external debug break signal. The external debug break signal is applied to the processor with which the logic circuit is associated to halt the execution of that processor. Each processor of the system may also include a debug interface, in which debug prioritization logic receives signals indicative of external debug break events and signals indicative of internal debug events incurred by the associated processor. The debug prioritization logic places the associated processor into the debug mode of operation in response to those signals. A register may be connected to the debug prioritization logic to indicate whether the processor was placed into the debug mode of operation in response to either the external debug break signals or the internal debug events. A pipeline flush mechanism may be connected to the debug prioritization logic to flush instructions from the pipeline prior to asserting of the debug event signal.

In accordance with the above-noted and other aspects, a multiprocessor debug method of the present invention involves placing each processor into the debug mode approximately simultaneously when any processor enters the debug mode as a result of incurring a debug event. Aspects of the method include asserting a debug event signal from a processor when that processor enters the debug mode, placing each other processor into the debug mode when the one processor asserts the debug event signal, asserting the external debug break signals to the other processors when one of the processors enters the debug mode, placing the other processors into the debug mode when the external debug break signal is asserted to that processor, and applying signals indicative of the external debug break signals and debug events incurred by the associated processor to debug prioritization logic and placing the associated processor into the debug mode of operation in response to those signals.

A more complete appreciation of the present invention and its improvements can be gained by reference to the accompanying drawings, which are briefly summarized below, by reference to the following detailed description of a presently preferred embodiment of the invention, and by reference to the appended claims.

DETAILED DESCRIPTION

Figure 1:
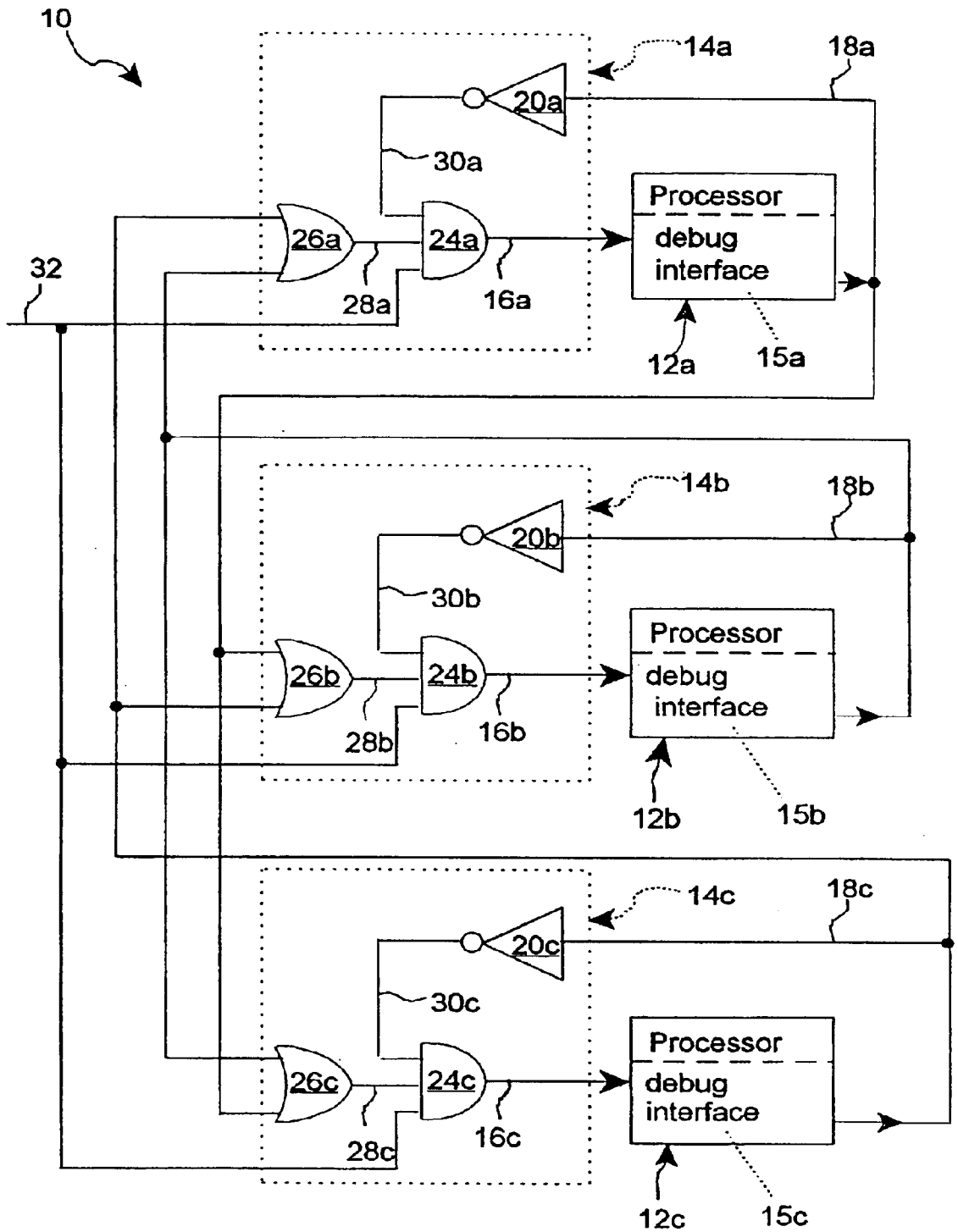
FIG. 1 is a block and logic diagram of processors and logic circuits of a multiprocessor system incorporating the present invention, which also illustrates implementation of the methodology of the present invention.

A portion of a multiprocessor system 10 which incorporates and implements the present invention is shown in FIG. 1. The microprocessor system 10 includes a plurality of processors 12a, 12b and 12c, each of which are connected to a plurality of associated external logic circuits 14a, 14b and 14c, respectively. A debug interface circuit 15a, 15b and 15c of each of the processors 12a, 12b and 12c connects the external logic circuits 14a, 14b and 14c to the processors 12a, 12b and 12c, respectively. Although three processors 12a, 12b and 12c are shown in FIG. 1, multiple processors, each with a debug interface circuit connected to an associated external logic circuit, can be included in the same manner as in the multiprocessor system 10. The multiprocessor system 10 may be part of a conventional computer, or the multiprocessor system 10 may be part of a specific device having dedicated functionality, for example a communications interface device.

The debug interface circuit 15a, 15b and 15c of each processor 12a, 12b and 12c of the system 10 responds to an input external debug break signal 16a, 16b and 16c, respectively, to halt processing of program instructions of its associated processor 12a, 12b and 12c, and causes the associated processor to enter a debug mode of operation. The debug interface circuit 15a, 15b and 15c of each processor 12a, 12b and 12c also supplies an output debug event signal 18a, 18b and 18c when the associated processor incurs a debug event. For example, a debug event is incurred as a result of executing a debug breakpoint instruction of a program which is running on one processor to cause that one processor to enter the debug mode when the debug breakpoint instruction is reached. Entry into the debug mode provides an opportunity for the programmer or user to resolve internal conflicts and achieve a steady state of operation for that processor. However, in a conventional multiprocessor system 10, the other processors may continue to execute their programmed instructions while the execution of instructions of one processor is halted. The external logic circuits 14a, 14b and 14c and the debug interface circuits 15a, 15b and 15c cause the other processors of the system 10 to each enter a debug mode and halt the processing of their programmed instructions approximately simultaneously with the one processor which incurred the debug event and halted the processing of its programmed instructions, thereby preserving the state of the program execution of all of the processors of the multiprocessor system 10 to facilitate resolving the problem or circumstance which caused the debug event.

Upon the one processor 12a, 12b or 12c which initially incurs the debug event entering the debug mode, the debug interface 15a, 15b or 15c of that one processor asserts a debug event signal 18a, 18b or 18c. The external logic circuits 14a, 14b and 14c of the other processors 12a, 12b and 12c which did not incur the debug event receive the debug event signal 18a, 18b and 18c, and in response, supply the external debug break signals 16a, 16b or 16c to the other debug interface circuits 15a, 15b or 15c. The other debug interface circuits 15a, 15b and 15c respond by causing their associated processors to halt further processing and enter the debug mode in response to the assertion of the debug event signal from the one processor.

Thus, upon one processor entering the debug mode as a result of executing a debug event, the debug event signal 18a, 18b or 18c from that one processor will cause the external logic circuits 14a, 14b and 14c to assert the external debug break signals 16a, 16b and 16c to all of the other processors 18a, 18b and 18c of the system 10 and place those other processors into the debug mode at approximately the same time and in approximately a synchronous manner with the entry of the one processor into the debug mode as a result of it incurring the debug event. As a consequence, the state and conditions of the instructions executed by all of the other processors are maintained for examination and evaluation as to any influence that the other processors may have on the one processor which incurred the initial debug event, or vice versa. Debugging is more effectively and efficiently performed by preserving near-simultaneous program-execution states of all of the processors under the condition of any one processor incurring a debug event.

The other processors of the system 10 may not instantaneously enter into the debug mode, because the state of processing their program instructions may not permit them to enter the debug mode until certain previously initiated events have concluded. For example, one other processor may be in a power saving mode or another processor may be waiting for information before concluding the execution of an instruction. In those circumstances, the other processors will halt as soon as possible without corrupting the program execution after the assertion of the associated external debug break signal 16a, 16b or 16c.

Each external logic circuit 14a, 14b and 14c includes an inverter 20a, 20b and 20c, an AND gate 24a, 24b and 24c, and an OR gate 26a, 26b and 26c, respectively. These logic gates, together with their input signals, generate external debug break signals 16a, 16b and 16c which are applied to the debug interfaces 15a, 15b and 15c of the processors 12a, 12b and 12c, respectively. The debug event signal 18a, 18b or 18c is supplied from the debug interfaces 15a, 15b and 15c to the OR gates 26a, 26b and 26c of the external logic circuits 14a, 14b and 14c associated with the other processors of the system 10. The OR gates 26a, 26b and 26c perform a logical OR of the debug event signals 18a, 18b and 18c supplied by the debug interfaces 15a, 15b and 15c of the other processors 12a, 12b and 12c and supply a debug trigger signal 28a, 28b and 28c to the AND gates 24a, 24b and 24c, whenever the debug interface of any other processor of the system 10 asserts a debug event signal 18a, 18b or 18c.

The debug event signals 18a, 18b and 18c are inverted by the inverters 20a, 20b and 20c of the associated external logic circuits 14a, 14b and 14c and supplied as inverted debug event signals 30a, 30b and 30c, respectively. The inverted debug event signals 30a, 30b and 30c are applied to another input terminal of the AND gates 24a, 24b and 24c. A debug reset signal 32, which is normally held at logic high level except when the system 10 is reset after all the processors have been placed into the debug mode, is applied to a third input terminal of each of the AND gates 24a, 24b and 24c. Each AND gate 24a, 24b and 24c performs a logical AND of its three input signals to create the external debug break signals 16a, 16b and 16c, respectively. The external debug break signals 16a, 16b and 16c are supplied to the debug interfaces of the processors 12a, 12b and 12c, respectively.

Each processor 12a, 12b and 12c which does not enter the debug mode as a result of incurring a debug event will assert a low level debug event signal 18a, 18b or 18c. The asserted low-level debug event signals are inverted by the inverters 20a, 20b and 20c and supplied as signals 30a, 30b and 30c to each of the associated AND gates 24a, 24b and 24c, respectively. The logic high-level signals 30a, 30b and 30c, in conjunction with the normal logic high reset signal 32, enables the AND gates 24a, 24b and 24c to respond to the assertion of the debug event signal 18a, 18b or 18c from any other processor which enters the debug mode as a result of incurring the debug event. Consequently, all of the processors other than the processor that incurs the debug event will enter the debug mode and halt execution of their program instructions upon the assertion of any one of the external debug break signals 16a, 16b and 16c. The other processors halt the execution of their program instructions approximately simultaneously with and in synchronism with the assertion of the debug event signals 18a, 18b or 18c from the one processor which incurs the debug event.

For example, assume that the processor 12b incurs a debug event during normal operation and enters the debug mode, and its debug interface 15b asserts the logic high-level debug event signal 18b. The high-level debug event signal 18b is supplied to the OR gates 26a and 26c of the external logic circuits 14a and 14c associated with the processors 12a and 12c. The presence of the high debug event signal 18b at the OR gates 26a and 26c results in those OR gates supplying high signals 28a and 28c to the AND gates 24a and 24c, respectively. Because processors 12a and 12c did not incur a debug event and are therefore not asserting the debug event signals 18a and 18c in this example, the signals 30a and 30b from the invertors 20a and 20c, respectively, are at a logic high-level. The debug reset signal 32 is also at a logic high-level. The logic high level signals 28a and 28c from the OR gates 26a and 26c combine with the logic high-level signals 30a and 30c and 32 in the AND gates 24a and 24c to create the external debug break signals 16a and 16c. The assertion of the external debug break signals 16a and 16c halts execution of programmed instructions by the processors 12a and 12c, as a result of placing those processors into the debug mode.

To prevent one processor from entering the debug mode for a second time when it enters the debug mode as a result of incurring a debug event, the external logic circuit associated with that one processor does not assert an external debug break signal 16a, 16b or 16c to that one processor which has initially incurred that debug event. This is illustrated in the example just described by the external logic circuit 14b not asserting the external debug break signal 16b to the processor 12b. When the processor 12b incurs the debug event and its debug interface asserts the debug event signal 18b, that high level debug event signal 18b is inverted by the inverter 20b to a low-level debug trigger signal 30b which is applied to one input of the AND gate 24b. With a low-level input signal 30b, the AND gate 24b will not assert a high level external debug break signal 16b to the processor 12b. Thus, the invertors 20a, 20b and 20c of the external logic circuits 14a, 14b and 14c prevent those external logic circuits from asserting an external debug break signal to the one processor which initially incurred the debug event.

The functionality described in the example of the processor 12b entering the debug mode as a result of executing a debug event, and thereby synchronously causing the other processors 12a and 12c to also enter the debug mode as a result of their associated logic circuits 14a and 14c asserting the external debug break signals 16a and 16c, is replicated when any one processor of the system 10 incurs a debug event. All of the other processors of the system 10 are placed into the debug mode as a result of that one processor entering the debug mode from incurring the debug event.

Figure 2:
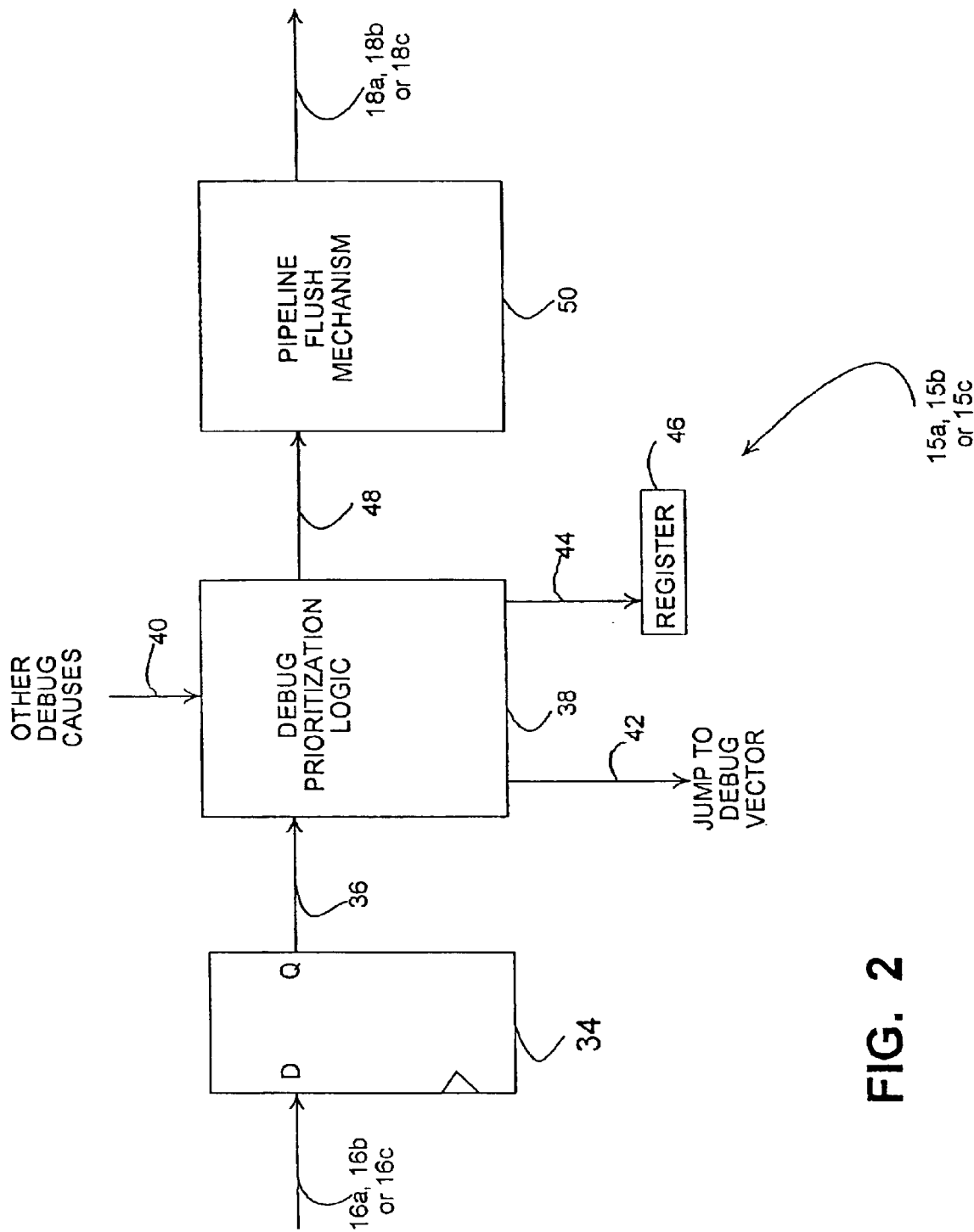
FIG. 2 is a block diagram of a debug interface of each processor of the multiprocessor system shown in FIG. 1.

Each debug interface 15a, 15b or 15c is shown in FIG. 2. The debug interface includes a flip-flop 34 which receives the external debug break signal 16a, 16b or 16c, and supplies an external debug break trigger signal at 36. The external debug break signals 16a, 16b and 16c are applied to set the flip-flop 34, and the output signal from the flip-flop 34 becomes the debug break trigger signal 36. The debug trigger signal 36 from the flip-flop 34 is applied to debug prioritization logic 38.

The debug prioritization logic 38 is a conventional logic gate device which is typically associated with processors having moderate to high levels of debug functionality. Logic gates of the debug prioritization logic 38 receive the debug trigger signal 36 as well as signals 40 which are indicative of other debug causes. In general, the other debug causes 40 are incurred both internally and the externally by the processor associated with the debug interface 15a, 15b or 15c. The signals 40 generally result from the internal execution of program instructions when the processor incurs a debug event. Other internal debug causes 40 may include signals generated by address comparators and data comparators upon execution of a load or a store operation to a predetermined address, or fetching instructions from a predetermined address, any of which may be interpreted to cause the debug event exception.

The debug prioritization logic 38 determines whether the cause 40 is a valid debug event, and if so, determines which of the debug causes 40 is to be given priority. Upon such a determination, the debug prioritization logic 38 delivers a signal 42 which causes a jump in instructions to the debug vector. The debug prioritization logic 38 also supplies a signal at 44 to a software readable register 46. The signal at 44 indicates the cause or type of the debug event which has been detected by the debug prioritization logic 38. The software readable register 46 is read to determine the type or cause of debug event. The information in the register 46, created by the signal 44, indicates the type of the debug event which was detected by the debug prioritization logic 38. The register 46 will indicate whether the debug event was incurred by the normal execution of the processor, and if so the type of incurred debug event.

In addition to responding to the signals 40 representing other debug causes, the debug prioritization logic 38 responds to the debug break trigger signal 36. In that case, the signals 44 to the register 46 will indicate whether the debug event was incurred as a result of the application of an external debug break signal 16a, 16b or 16c to the flip-flop 34. The information from the register 46 is useful in probing the causes and effects of debug events, when the multiprocessor system is placed into the debug mode.

Upon the debug prioritization logic 38 detecting a valid internal debug event, a signal 48 is applied to a conventional pipeline flush mechanism 50 of the processor. The pipeline flush mechanism 50 will flush the pipeline of instructions executing within the processor to prevent the processor executing further instructions beyond those under execution at approximately the time of the internal debug event, thereby preserving the state of the instruction execution within the processor. Once the pipeline has been flushed by the mechanism 50, an output register of that mechanism 50 will supply the debug event signal 18a, 18b or 18c.

A similar circumstance occurs upon the application of a debug break trigger signal 16a, 16b or 16c. The flip-flop 34 generates the debug trigger signal 36, and the debug prioritization logic 38 responds by delivering the signal 48 to the pipeline flush mechanism 50. The pipeline of instructions executing within the processor is flushed. The state of the instruction execution within the processor is thereby preserved, so that it may be examined as part of the similarly-preserved states of all of the processors in the multiprocessor computer system. Thus, the instruction states of all of the processors in the multiprocessor computer system are essentially preserved in response to any single one of those processors incurring an internal debug cause signal 40.

Once the pipeline of instructions has been flushed by the mechanism 50, the debug event signal 18a, 18b or 18c is asserted through the inverter 20a, 20b or 20c of the associated external logic circuit 14a, 14b or 14c, as shown in FIG. 1. The signal from the inverter 20a, 20b or 20c causes a change in the logic level of the debug break signal 16a, 16b or 16c at the AND gate 24a, 24b or 24c, thus clearing the flip-flop 34 in preparation for the next debug event.

The debug interface 15a, 15b or 15c uses a relatively small amount of additional logic hardware, i.e. the flip-flop 34, to take advantage of a capability of responding to a single external debug break signal 16a, 16b or 16c. Similarly, the ability of the conventional pipeline flush mechanism 50 to supply the single debug event signal 18a, 18b or 18c does not increase the hardware requirements of the debug interface to execute the present invention. Supplying the single debug event signal 18a, 18b or 18c allows the logic circuits 14a, 14b and 14c to respond almost immediately to the occurrence of a debug event incurred by one of the processors of a multiprocessor system. The relatively simple logic circuits and the debug interfaces effectively place all the processors of the multiprocessor system into the debug mode approximately simultaneously, and in a much simpler manner than if the debug monitor software was required to recognize the debug event and send interrupts through serial interfaces of the other processors to cause the other processors to go into the debug mode. Nevertheless, software which performs the functions of the logic circuits and the debug interfaces to communicate a debug interrupt signal through serial interfaces for the purpose of placing all the processors of a multiprocessor computer system into the debug mode approximately simultaneously upon the occurrence of any one of the processors of the multiprocessor system incurring an internal debug event is also within the scope of the present invention.

The order in which the processors enter the debug mode after the initiating one of the processors enters the debug mode as a result of incurring the debug event depends on propagation delays of the signals and transition delays of the components of the logic circuits 14a, 14b and 14c, as well as the execution states of the other processors. However, once the initiating one processor enters the debug mode, the other processors will respond approximately simultaneously by entering the debug mode. The state and condition of execution of the instructions by the other processors is thereby preserved as much as possible, so as to enable the programmer or user to evaluate the conditions existing at the time that the one processor incurred the debug event.

The processors 12a, 12b and 12c are brought out of the debug mode under software control of the debug monitor program which initiated placing all the processors into the debug mode. The debug monitor program of the one processor which placed the other processors into the debug mode resumes the execution of the interrupted program by that one processor. Each other processor may ignore the external debug break signal 16a, 16b and 16c for a sufficient period of time during which the one processor which initially incurred the debug event de-asserts the debug event signal. During this time period, the de-assertion of the debug event signal 18a, 18b or 18c causes the de-assertion of high level signals 28a, 28b and 28c from the OR gates, thereby causing the negation or de-assertion of the external debug break signals 16a, 16b and 16c to bring the processors out of the debug mode.

Alternatively, as another technique of bringing the processors out of the debug mode, the debug reset signal 32 may be negated to assume a logic low level. The logical low debug reset signal 32 causes the AND gates 24a, 24b and 24c to de-assert the external debug break signals 16a, 16b and 16c, respectively. As a result, the processors 12a, 12b and 12c are brought out of the debug mode. Of course, the debug reset signal 32 has a logic high value during normal operation, which allows the external logic circuits 14a, 14b and 14c to generate external debut break signals 16a, 16b and 16c in the aforementioned manner. The debug reset signal 32 is driven in response to the execution of the debug monitor program and from system reset. For example, the debug reset signal 32 may be driven by an output of a testing register which is loaded by the debug monitor program. Other methods of negating or de-asserting the external debug break signals 16a, 16b and 16c while the processors 12a, 12b and 12c are brought out of the debug mode may also be used.

The external debug break signals 16a, 16b and 16c and external logic circuits 14a, 14b and 14c associated with each processor 12a, 12b and 12c allow all of the processors to enter the debug mode when any one processor 12a, 12b and 12c goes into the debug mode and asserts the debug event signal 18a, 18b and 18c. All the processors 12a, 12b and 12c enter the debug mode in an approximately simultaneous and synchronous manner, almost immediately after the one processor 12a, 12b and 12c initially incurs the original debug event and enters the debug mode. The approximately simultaneous entry of all the processors 12a, 12b and 12c into the debug mode better preserves the states of execution of each of the processors of the multiprocessor system 10 to facilitate multiprocessor debug. Because the other processors 12a, 12b and 12c execute very few, if any, instructions between the time when the first processor enters the debug mode and the time when the last processor enters the debug mode, the operational states of the multiple processors are preserved in a condition for better evaluation. Many other advantages and improvements will be apparent after gaining an understanding of the present invention.

The presently preferred embodiment of the present invention has been shown and described with a degree of particularity. These descriptions are of preferred examples of the invention. In distinction to its preferred examples, it should be understood that the scope of the present invention is defined by the scope of the following claims, which should not necessarily be limited to the detailed description of the preferred embodiment set forth above.

The invention claimed is:

1. In a system having multiple processors wherein each processor enters a debug mode of operation as a result of incurring a debug event, an improvement comprising:
   a debug interface associated with each one processor which asserts a debug event signal when the associated one processor enters the debug mode as a result of incurring an internal debug event; and
   a logic circuit associated with each processor and receptive of the debug event signal supplied by each other processor of the system, each logic circuit responding to the debug event signal supplied by each other processor to assert an external debug break signal to the processor associated with the logic circuit; and
   the debug interface further responds to the external debug break signal supplied by the associated logic circuit to place the processor into the debug mode.

2. In a system as defined in claim 1 wherein:
   each logic circuit asserts the external debug break signal to its associated processor approximately simultaneously with the assertion of the debug event signal.

3. In a system as defined in claim 1 wherein:
   the logic circuit associated with one processor further responds to the assertion of the debug event signal by the one processor to prevent the assertion of the external debug break signal to the one processor.

4. In a system as defined in claim 1 wherein:
   each logic circuit is further responsive to a debug reset signal to de-assert the external debug break signal upon the assertion of the debug reset signal.

5. In a system as defined in claim 1 wherein each logic circuit further includes:
   an OR gate connected to each other processor to receive the debug event signal asserted by any one processor;
   an AND gate connected to the OR gate, the AND gate receiving a signal indicative of the assertion of the debug event signal by the associated processor; and wherein:
   the OR gate supplies a signal to the AND gate indicative of the assertion of a debug event signal from any other processor; and the AND gate supplies the external debug break signal to the associated processor in response to the assertion of the debug event signal from any other processor; and
the AND gate de-asserts the external debug break signal to the associated processor in response to the negation of the debug event signal from any other processor.

6. In a system as defined in claim 5, wherein:
   a debug reset signal is asserted to remove all other processors from the debug mode after the one processor ceases operation in the debug mode; and
   the AND gate receives the debug reset signal as an additional input signal to de-assert the external debug break signal to the associated processor upon the assertion of the debug reset signal.

7. In a system as defined in claim 5, wherein each logic circuit further includes:
   an inverter connected to receive the debug event signal from the associated processor and operative to invert the debug event signal and supply an inverted debug event signal as one input signal to the AND gate.

8. In a system as defined in claim 7, wherein:
   the inverted debug event signal causes the AND gate to supply the external debug break signal only when the debug event signal is not asserted by the one processor.

9. In a system as defined in claim 1, wherein the debug interface comprises:
   debug prioritization logic receptive of signals indicative of external debug break signals and indicative internal debug events incurred by the associated processor, the debug prioritization logic placing the associated processor into the debug mode of operation in response to signals indicative of either the external debug break signals or the internal debug events.

10. In a system as defined in claim 9, wherein the debug interface further comprises:
    a register connected to receive the signal from the debug prioritization logic indicative of whether the processor was placed into the debug mode of operation in response to either the external debug break signal or the internal debug events.

11. In a system as defined in claim 9, wherein the debug interface further comprises:
    a flip-flop receptive of the external debug break signal and connected to the debug prioritization logic, the flip-flop supplying a trigger debug break signal to the debug prioritization logic in response to the external debug break signal.

12. In a system as defined in claim 9, wherein each processor executes instructions in a pipeline, and the debug interface further comprises:
    a pipeline flush mechanism connected to the debug prioritization logic and responsive to flush instructions from the pipeline prior to assertion of the debug event signal.

13. A method of approximately simultaneously halting execution of instructions by each processor of a system having multiple processors upon one of the processors of the system entering a debug mode of operation as a result of incurring a debug event, comprising:
    halting execution of instructions by the one processor to place that one processor into a debug mode of operation upon that one processor incurring a debug event; and
    after halting execution of instructions by the one processor, placing each other processor of the system into a debug mode of operation approximately simultaneously with the one processor entering the debug mode of operation by sending an external debug break signal from the one processor to each other processor of the system to cause each other processor to enter the debug mode of operation.

14. A method as defined in claim 13, further comprising:

asserting a debug event signal from the one processor upon entering the debug mode of operation; and placing each other processor into the debug mode in response to the assertion of the debug event signal by the one processor by generating the external debug break signals for the other processors of the system in response to the assertion of the debug event signal by the one processor.

15. A method as defined in claim 13, further comprising:

placing each other processor into the debug mode by the assertion of the external debug break signal to each other processor;

asserting the external debug break signal to each other processor in response to the one processor asserting the debug event signal.

16. A method as defined in claim 15, further comprising:

inhibiting the assertion of the external debug break signal to a processor which is asserting the debug event signal.

17. A method as defined in claim 13, further comprising:

utilizing a logic circuit associated with each processor to generate an external debut break signal for the associated processor; and applying a debug event signal from the one processor to the logic circuit associated with each other processor.

18. A method as defined in claim 13, further comprising:

connecting an OR gate to each other processor to receive a signal indicative of the assertion of the debug event signal by the one processor;

connecting an AND gate to the OR gate;

supplying a signal from the OR gate to the AND gate indicative of the occurrence of a debug event signal from the one processor;

supplying the external debug break signal from the AND gate to the associated processor in response to the occurrence of a debug event signal from the one processor; and de-asserting the external debug break signal to the associated processor in response to the de-assertion of the debug event signal from the one processor.

19. A method as defined in claim 18, further comprising:

asserting a debug reset signal to remove all other processors from the debug mode after the one processor ceases operation in the debug mode.

20. A method as defined in claim 19, further comprising:

supplying the debug reset signal as an additional input signal to the AND gate; and de-asserting the external debug break signal upon the assertion of the debug reset signal.

21. A method as defined in claim 20, further comprising:

connecting an inverter to receive and invert the debug event signal from the associated processor; and supplying the inverted debug event signal as an input signal to the AND gate.

22. A method as defined in claim 21, further comprising:

inverting the debug event signal to a logical level which causes the AND gate to supply the external debug break signal to the associated processor only when the debug event signal is not asserted by the associated processor.

23. A method as defined in claim 13, further comprising:

applying a signal indicative of the external debug break signal and a signal indicative of an internal debug event incurred by the associated processor to debug prioritization logic of the associated processor; and placing the associated processor into the debug mode of operation in response to signals indicative of either the external debug break signal or an internal debug event.

24. A method as defined in claim 23, further comprising:

indicating in a register connected to the debug prioritization logic whether the processor was placed into the debug mode of operation in response to either the external debug break signal or the internal debug event.

25. A method as defined in claim 23, further comprising:

flushing instructions from a pipeline of the associated processor in response to the associated processor incurring an internal debug event and before the associated processor asserts the debug event signal.

* * * * *